INVENTORS.
WILLIAM J. KELLY &
ALLEN J. CHRISTIAN
BY
*Fay, Sharpe & Mulholland*
ATTORNEYS United States Patent Office 3,485,232
Patented Dec. 23, 1969

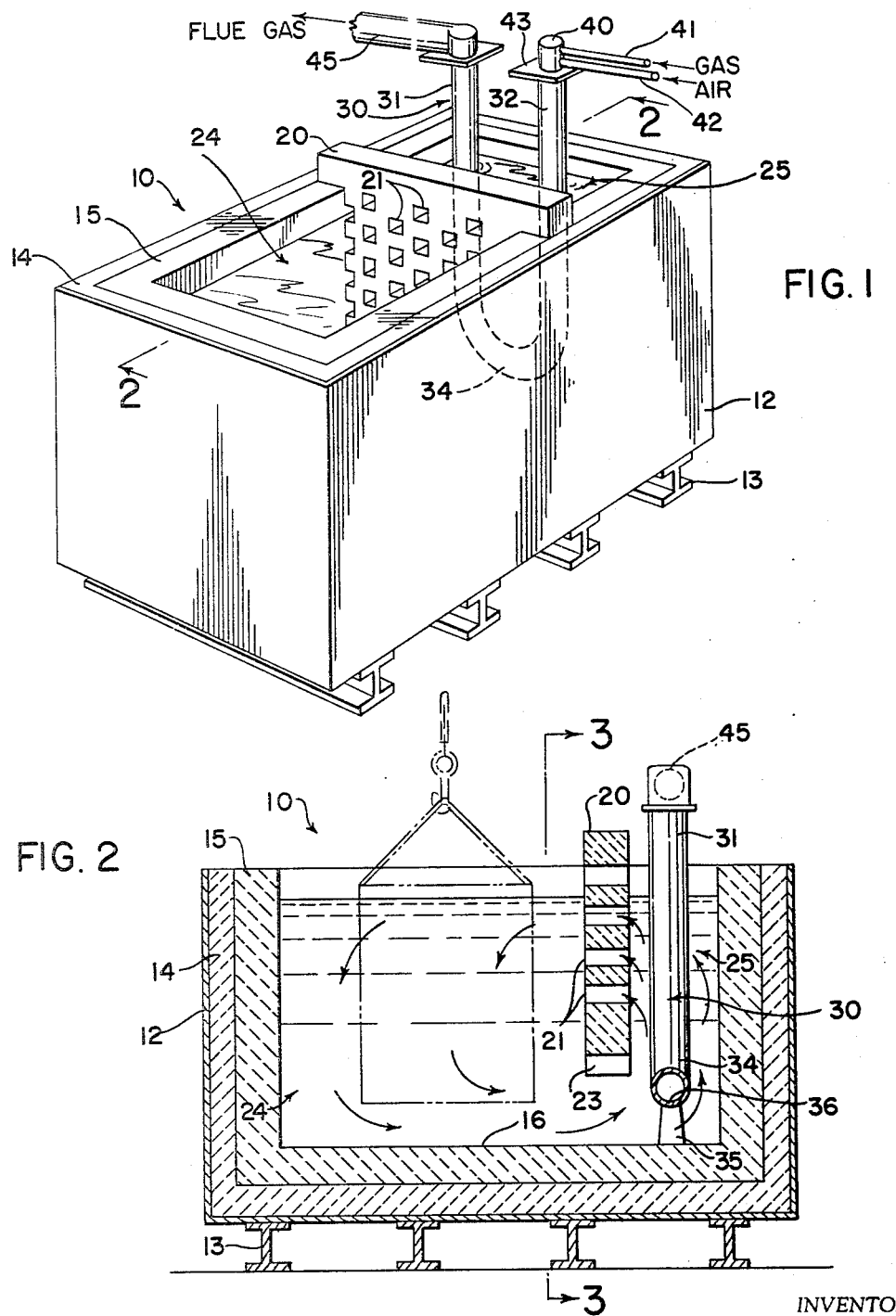

3,485,232
SALT BATH FURNACE
William J. Kelly, S. River Road, and Allen J. Christian, 6387 Rte. 307 W., both of Geneva, Ohio 44041
Filed Nov. 4, 1966, Ser. No. 592,213
Int. Cl. F24h 1/20
U.S. Cl. 126—360                             10 Claims

ABSTRACT OF THE DISCLOSURE

Disclosed is a salt bath furnace of the open topped tank type having a lining of refractory material defining a central liquid salt containing cavity. A generally vertically disposed divider of refractory material separates the cavity into a heat treating portion and a salt heating portion. The divider has upper and lower transverse passages to permit a substantially circulatory fluid communication between the cavity portions. A ceramic tube is mounted in the salt heating portion on a ceramic mount such that a gas combustion burner may be mounted in sealed communication in one end of the tube to direct a flame into the tube to maintain the salt in a heated state and circulate it by convection.

This invention concerns an improved gas-fired salt bath furnace and method of heat treating which is particularly adapted for annealing, normalizing, hardening or otherwise heating work pieces such as castings, forgings, dies and other metal parts to temperatures up to 2,200° and holding them at that temperature for a period of time. The salt bath furnace and method of heat treating of the invention utilizes a suitable commercial salt such as barium chloride for heat transfer to the work.

The furance of the invention broadly comprises an open topped tank with a lining of refractory material which defines a central cavity in the tank for holding the salt. A divider or baffle of refractory material separates the cavity into a heat treating portion and a salt heating portion and has upper and lower passages transversely therethrough to permit fluid flow from one portion of the cavity to the other in a substantially circulatory pattern. The salt is melted and circulated within the cavity by convection currents set up by heat from a gas fired tube. The heating tube is of ceramic material, preferably mullite, and has a bight shape which includes two upstanding legs. The legs project from the cavity on one side of the divider and the tube is held in spaced relation to the bottom and the walls of the cavity by a ceramic pedestal. One of the upstanding tube legs has a gas combustion burner in sealed communication therewith for directing a flame into the tube, and the other leg in a preferred embodiment has an eductor for drawing the gases of combustion through the tube.

The divider is spaced from the bottom of the cavity so that in the event that the ceramic tube should break, large pieces may be moved from the salt heating area, under the divider and into the work area where they may be recovered without the necessity of emptying the salt from the cavity. The smaller fragments will remain out of the heat treating portion and within the salt heating portion around the pedestal in a harmless location.

Because the furnace comprises an open topped tank, there is no metal structure to be contaminated by the molten salt, either within the cavity or directly above it. This is extremely important when it is considered that the salt when heated to temperatures up to 2,200° F., is extremely corrosive to virtually all metals exposed to it over a long period of time.

In general, prior art salt bath furances capable of utilization at temperatures up to 2,200° F. have been unsatisfactory because they required electric heating, which is extremely expensive for these higher temperature ranges. Other prior art devices have utilized mechanical agitation with gas heating. This has been because with gas heating, it has heretofore been difficult to maintain an even bath temperature, particularly in high temperature furnaces, without providing a mechanical agitator within the molten salt itself. It has been known in this regard to provide propeller type agitators which, because of the highly corrosive nature of the molten salt, need frequent maintenance, repair and replacement.

Because of the particular structure of the furance of this invention with its checkered brick divider and bight-shaped tube mounted on a pedestal on a side of the divider opposite the work to be heat treated, a circulatory motion to the salt bath is automatically provided. This novel arrangement eliminates the need for expensive and complex mechanical agitators in salt baths having temperature ranges up to 2,200° F. Accordingly, it is possible to arrive at temperature variations of plus or minus 10° F., which is an extremely close tolerance and provides for excellent heat treating control for the user.

The use of cast mullite ceramic tubes and pedestals has permitted a tube of bight shape which creates the circulatory motion in the bath even though the temperature reaches levels which would easily corrode and destroy metal parts of gas fired tubes of conventional design. Because of the nature of the high temperature ceramic or mullite material for this purpose, it was discovered that mounting the tube on a pedestal for easy replacement by moving it directly up out of the furnace and alongside the divider was possible. The mullite has extremely high strength characteristics even at the temperatures of up to 3,000° F., to which it may be subjected on the inside of the tube by the gas combustion flame.

If it should happen that the ceramic pedestal or tube is accidentally damaged, the pieces are removed as aforesaid in the same manner that sludge and other contaminates are removed from the bottom of the cavity in the normal course of operation of a salt bath furnace. Breakage of the high temperature resistant ceramic parts is extremely unlikely, however, because of the particular design of the furnace wherein the divider wall which enhances the circulatory effect to maintain the even bath temperature throughout, also acts as a physical buffer between the cavity portion that receives the work to be heat treated and the portion containing the ceramic pedestal and tube. For this reason, there is very little likelihood that the tube will break or will jar out of position from its pedestal.

Accordingly, utilizing the novel and extremely simple furnace design of the instant invention, a method of heat treating has been devised which permits merely directing the flame of a gas combustion burner into the tube to melt the salt and maintain it at a predetermined temperature which may be up to 2,200° F. When the bath temperature reaches this point, the molten salt is automatically circulating generally upwards on the tube side of the divider and generally downwards on the side of the divider opposite the tube to thereby maintain a substantially uniform salt bath temperature. Thus, the work pieces may be placed in the portion of the cavity opposite the tube, and they will receive a uniform closely controlled heating from the heat transferred through the salt medium from the tube.

Accordingly, it is an object of the invention to provide an improved and simplified salt bath furnace of the gas-fired type which utilizes the economies of fuel provided by natural gas and air combustion and yet permits a substantially even temperature of up to 2,200° F. throughout the bath without mechanical agitation.

It is a further object of the invention to provide a method of heat treating in a gas fired salt bath furnace up to 2,200° F. whereby it is not necessary to provide mechanical agitation to the bath.

Other and more specific objects of the invention will be apparent from the detailed description to follow.

In the drawings:

FIG. 1 illustrates a perspective view of a salt bath constructed according to the principles of this invention.

FIG. 2 is a cross-sectional elevational view taken along the lines 2—2 of FIG. 1.

Figure 3:
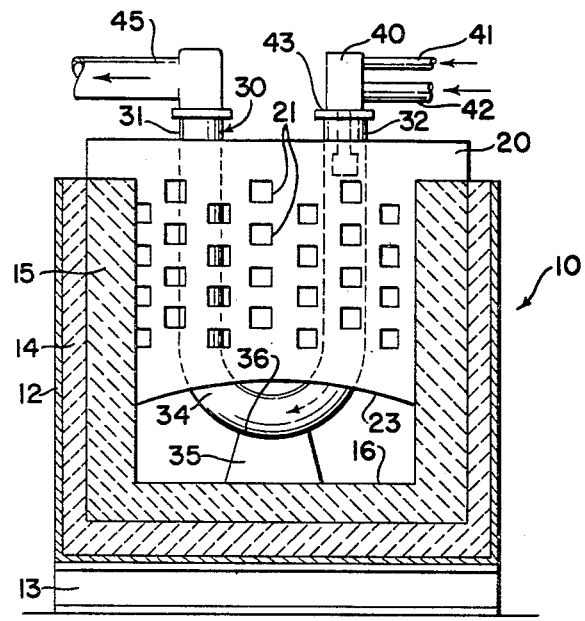
FIG. 3 is a cross-sectional view taken along the lines 3—3 of FIG. 2.
Figure 4:
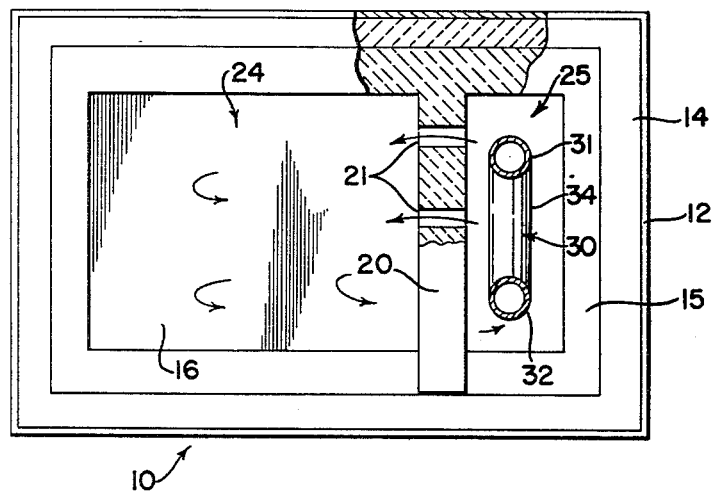
FIG. 4 is a plan view of the FIGURES 1–3 of the furnace.

In the embodiment illustrated, the numeral 10 generally designates a salt bath furnace constructed according to the principles of this invention in which a tank 12, preferably of metal is provided of generally rectangular shape. The tank 12 rests on suitable supports such as I-beams 13 and may be of welded or bolted construction. An insulation material 14 such as fire brick or blocks is laid in against the metal tank 12. An example of fire brick found to be effective is that having the following characteristics: (1) linear shrinkage of 1.0% at 1,900° F.; (2) ability to withstand 1,900° F.; (3) a density of 18.5 pounds per cubic foot; (4) incombustible; and (5) a breaking strength of 23 pounds.

A refractory high alumina brick lining 15 is then set in the cavity bottom 16 and up the sides of the cavity until it is even with the top edge of the metal 12 of the tank. The lining 15 is of "stiff mud" and the mortar is a high alumina type. One example of the "stiff mud" brick which has worked successfully has a chemical composition of the following percentages by weight: Silica ($SiO_2$), 50.0 to 53.0%; Alumina ($Al_2O_3$), 42.0 to 45.0%; Iron Oxide ($Fe_2O_3$), 1.0 to 2.5%; Titania ($TiO_2$), 1.5 to 2.5%; Lime (CaO), 0.0 to 0.6%; Magnesia (MgO), 0.0 to 0.6%; and Alkalies ($Na_2O$—$K_2O$), 0.5 to 2.0%. Other physical properties of this brick are: (1) linear change of 0.0 to +2.5% at 2,910° F.; (1) a bulk density of 2.40 to 2.48 grams per cubic centimeter; and (3) a cold crushing strength of 4,000 to 8,000 p.s.i. A typical high alumina type mortar has the following characteristics: (1) ability to withstand temperatures of 2,910° F.; (2) a particle size equal to or less than 0.5% retention on a Tyler No. 35 sieve (opening of 420 micron); and (3) bond strength of 800 to 1,400 p.s.i. after preheating to 2,550° F.

A checkered brick wall 20, preferably of the same material as the wall 15 is provided having a plurality of openings 21 therein to provide fluid communication from one side of the wall to the other. The checkered wall defines a bridge type archway 23 spaced from the cavity bottom 16. The opening defined by the lining on the bottom 16 and the archway 23 is the lower fluid passage through which the molten salt circulates back from heat treating side 24 to the salt heating side 25 of the cavity.

Within the cavity portion 25 is a ceramic tube 30 of bight or U-shape configuration having two upstanding legs 31 and 32. The upstanding legs 31 and 32 meet in a loop or bight 34 which rests on a ceramic pedestal 35 and has a contoured upper surface 36 which conforms to the outer curvature of the bight 34. At the top of the upstanding leg 32 is a gas combustion burner 40 having a gas supply conduit 41 and an air supply conduit 42 attached thereto. The burner 40 is attached to the leg 32 by means of a flange 43 or other suitable means.

The gas burner 40 is a pull through radiant tube burner Series 4729 manufactured by the North American Manufacturing Company, 4455 East 71st St., Cleveland, Ohio 44105, and includes the necessary components. Of course, other burners may be utilized if they provide the equivalent function. On top of the upstanding tube leg 31 is an eductor or flue 45 for exhausting the gas if the suggested pull through radiant Series 4729 is utilized. A Series 8440 eductor manufactured by the same company is preferably utilized for the means 45 to carry away the exhaust gases. This eductor removes approximately 1 part of combustion air for each 1.1 part of primary air so that the flame will be drawn through the tube for complete heating.

As has been stated, other radiant tube burners such as the Series 4725 North American burners may also be utilized with normal exhaust arrangements and without the eductor 45. Even though burners of type specified may have up to as much as 450,000 b.t.u. per hour capacity, the ceramic tube 30 and the pedestal 35 upon which it rests will remain serviceable because they are made of a vitreous refractory mullite. This material has good chemical and atmosphere corrosion resistance at elevated temperatures and excellent thermal shock resistance. It has a specific gravity of 2.7 and it is substantially impervious to gas up to 2,732° F. Its compressive strength is 150,000 p.s.i., and tensile strength is 18,000 p.s.i. with a transverse strength of 26,000 p.s.i., and it has good heat conductivity considering its properties, i.e., 17.4 b.t.u. per hour per square foot per inch per degree Fahrenheit. These properties give the ceramic material a maximum service temperature of 3,200° F. when cast into the desired shape for this purpose.

Thus, it will be seen that by constructing a salt bath furnace according to the principles of this invention, it is possible to easily replace the radiant tube while the bath is still hot without the necessity of chilling the bath and chipping out the frozen salt as has been necessary to remove broken electrical electrodes of electrical salt bath furnaces in the past. The entire concept of the furnace is one of ease of maintenance so that draining of the salt from the furnace will become a very infrequent necessity with attendant savings in time, material and labor during production. It is obvious that the salt bath constructed according to the principles of this invention can be utilized in a production line with an overhead conveyor having a vertical lowering station properly timed to the proper heat treating sequence.

It is contemplated that an embodiment of this invention might utilize a bight-shaped tube at either end of the furnace, each separated from the heat treating area by a checkered brick divider. Using this arrangement the heat treating area would be located in the middle of the furnace and the heat circulatory effect would be doubled. Another embodiment is contemplated where more than one bight-shaped tube is located in the salt treating area or areas.

For ease of description the principles of the invention have been set forth in connection with but a single illustrated embodiment showing the salt bath furnace of the invention. It is not our intention that the illustrated embodiment nor the terminology describing it be limiting inasmuch as variations to these may be made without departing from the spirit of the invention. Rather we desire to be restricted only by the scope of the appended claims.

We claim:

1. A liquid bath furnace comprising:
    an open topped tank,
    a lining of refractory material defining a central liquid containing cavity in said tank,
    a generally vertically disposed divider of refractory material separating said cavity into a heat treating portion and a liquid heating portion,
    at least one upper passage and one lower passage transverse of said divider to permit substantially circulatory fluid communication between said cavity portions,
    a ceramic tube having a bight shape which includes two upstanding legs,
    a ceramic mount within said cavity having a surface portion engaging a surface portion of said tube to support said tube at a distance from the bottom and walls of said cavity within said liquid heating portion, one of said upstanding legs having a gas combustion burner in sealed communication with an end thereof for directing a flame into said tube to maintain the liquid in said cavity in heated state and circulate it by convection.

2. The furnace of claim 1 in which the divider has a plurality of openings defining the upper passage and the lower passage is defined on three sides by the bottom and two opposing sides of the central liquid containing cavity.

3. The furnace of claim 1 in which the upstanding legs of the tube and the bight shape therebetween define a plane substantially parallel to the divider.

4. The furnace of claim 1 in which the ceramic mount is a pedestal resting on the bottom of said cavity and the engaged surface portions of the pedestal and tube are at the lower end of the bight shape.

5. The furnace of claim 1 in which the upstanding tube leg other than the one having the burner is in communication with an eductor.

6. The furnace of claim 1 in which the ceramic tube and mount are cast vitreous refractory mullite.

7. The furnace of claim 1 in which the tank is of metal and the refractory lining is separated from the tank by insulation.

8. The furnace of claim 1 in which the divider includes a checkered brick construction spaced from the bottom of said cavity.

9. The furnace of claim 1 in which the ceramic tube and pedestal can withstand temperatures up to at least 3,000° F.

10. The furnace of claim 1 in which the liquid is molten salt.

References Cited

UNITED STATES PATENTS

| | | | |
|---|---|---|---|
| 2,231,009 | 2/1941 | Holt | 148—15 |
| 2,515,618 | 7/1950 | Wallerius | 126—360 |
| 2,611,362 | 9/1952 | Swindin. | |
| 2,816,849 | 12/1957 | Ankersen | 148—20 |
| 3,124,122 | 3/1964 | Baron | 126—360 |

OTHER REFERENCES

General Refractories Company, Philadelphia, Pa., 1949, "Refractories," p. 264. Copy in Group 344.

FREDERICK L. MATTESON, Jr., Primary Examiner

ROBERT A. DUA, Assistant Examiner